United States Patent
Cunningham et al.

(10) Patent No.: US 6,317,954 B1
(45) Date of Patent: Nov. 20, 2001

(54) SYSTEM AND METHOD FOR ALIGNING AIRCRAFT COORDINATE SYSTEMS

(75) Inventors: Clifton D. Cunningham; James P. Koesters, both of Grapevine; Michael A. Leenhouts, Arlington; Eric D. Moore, Grand Prairie, all of TX (US)

(73) Assignee: Vought Aircraft Industries, Inc., Dallas, TX (US)

( * ) Notice: Subject to any disclaimer, the term of this patent is extended or adjusted under 35 U.S.C. 154(b) by 0 days.

(21) Appl. No.: 09/081,721

(22) Filed: May 11, 1998

(51) Int. Cl.[7] ................................................. B23Q 17/00
(52) U.S. Cl. ..................... 29/407.09; 29/407.1; 29/709; 33/286
(58) Field of Search ..................... 29/407.01, 407.04, 29/407.09, 407.1, 464, 466, 709, 720, 559, 897.2; 33/286, 533, 613, 645, 288; 356/375

(56) References Cited

U.S. PATENT DOCUMENTS

| | | |
|---|---|---|
| 4,741,497 | 5/1988 | Fox . |
| 4,845,856 * | 7/1989 | Rochette ................................. 33/286 |
| 4,937,768 | 6/1990 | Carver et al. . |
| 4,945,488 | 7/1990 | Carver et al. . |
| 4,994,989 | 2/1991 | Usami et al. . |
| 5,005,277 * | 4/1991 | Uemura et al. ......................... 29/720 |
| 5,010,634 * | 4/1991 | Uemura et al. ......................... 29/720 |
| 5,023,800 | 6/1991 | Carver et al. . |
| 5,033,014 | 7/1991 | Carver et al. . |
| 5,148,591 * | 9/1992 | Pryor ...................................... 29/407 |
| 5,380,978 | 1/1995 | Pryor . |
| 5,671,523 * | 9/1997 | Juchinewicz ............................ 29/559 |
| 5,910,894 * | 6/1999 | Pryor ...................................... 29/712 |
| 6,014,814 * | 1/2000 | Imbert et al. ........................... 33/286 |
| 6,040,903 * | 3/2000 | Lysen et al. ............................ 33/645 |

* cited by examiner

*Primary Examiner*—I Cuda Rosenbaum
*Assistant Examiner*—T. Nguyen
(74) *Attorney, Agent, or Firm*—Baker Botts L.L.P.

(57) ABSTRACT

A system and method for aligning aircraft coordinate systems includes determining a first coordinate in the first coordinate system from a first reflector using a first coordinate positioning device, and determining second and third coordinates in the second coordinate system from second and third reflectors, respectively, using a second coordinate positioning device. The second and third reflectors are disposed at predetermined distances from the first reflector. The system aligns the first and second coordinate systems based on the first, second, and third coordinates and the predetermined distances using a processor.

25 Claims, 6 Drawing Sheets

SYSTEM AND METHOD FOR ALIGNING AIRCRAFT COORDINATE SYSTEMS

RELATED APPLICATIONS

This application is related to U.S. patent application Ser. No. 09/081,720, filed May 11, 1998, entitled System and Method for Assembling an Aircraft.

TECHNICAL FIELD OF INVENTION

This invention relates in general to the field of aircraft manufacturing and, more particularly, to a system and method for aligning aircraft coordinate systems.

BACKGROUND OF THE INVENTION

Constructing an aircraft begins with assembling detail parts into aircraft subassemblies. These aircraft subassemblies are later positioned adjacent one another for final assembly of the aircraft. Tooling fixtures are used throughout the assembly process to prevent detail parts and aircraft subassemblies from being located and assembled incorrectly. For example, one type of tooling fixture may include fixed position stops that the detail fitting or aircraft subassembly seats against in order to position the detail part or aircraft subassembly in three dimensions. After locating the detail part or aircraft subassembly with the tooling fixture, the detail part or aircraft subassembly may be drilled or attached to mating aircraft structure.

In addition to tooling fixtures, detail parts and aircraft subassemblies often include interface control points to properly locate mating aircraft structure. For example, one aircraft supplier may manufacture and supply the wings of the aircraft while another aircraft supplier may manufacture and supply the fuselage of the aircraft. The wing and fuselage subassemblies may contain interface control points to prevent mislocating or misaligning the wing subassemblies with the fuselage subassembly during final assembly of the aircraft. Three-dimensional locating methods, such as laser optical positioning systems, may be used to prevent mislocating or misaligning detail parts or aircraft subassemblies during assembly.

Three-dimensional locating methods for aircraft assembly, however, suffer several disadvantages. For example, variations in aircraft structure design may prevent a single three-dimensional positioning device from locating and generating three-dimensional coordinates for all the interface critical control points of the aircraft. However, if two or more three-dimensional positioning devices are used, the three-dimensional positioning devices will generate a corresponding number of coordinate systems.

SUMMARY OF THE INVENTION

Accordingly, a need has arisen for an improved system and method for aligning aircraft coordinate systems. According to one embodiment of the invention, a method for aligning a first aircraft coordinate system with a second aircraft coordinate system comprises: determining a first coordinate in the first coordinate system from a first reflector using a first coordinate positioning device; determining a second coordinate in the second coordinate system from a second reflector using a second coordinate positioning device, the second reflector disposed a first predetermined distance from the first reflector; determining a third coordinate in the second coordinate system from a third reflector using the second coordinate positioning device, the third reflector disposed a second predetermined distance from the first reflector; and aligning the first and second coordinate systems, using a processor, based on the first, second, and third coordinates and the first and second predetermined distances.

According to another embodiment of the invention, an apparatus for aligning a first aircraft coordinate system associated with a first positioning device with a second aircraft coordinate system associated with a second positioning device comprises: a first reflector mounted to a control point fitting and oriented to receive an optical signal from the first optical positioning device; a second reflector mounted to the control point fitting and oriented to receive an optical signal from the second optical positioning device, the second reflector disposed a first predetermined distance from the first reflector; and a third reflector mounted to the control point fitting and oriented to receive an optical signal from the second optical positioning device, the third reflector disposed a second predetermined distance from the first reflector.

The invention provides several technical advantages. For example, in one embodiment of the invention, the system determines a control point for a one aircraft coordinate system and determines an equivalent control point for another aircraft coordinate system. In the same embodiment, the system aligns the different aircraft coordinate systems using the control point and the equivalent control point.

Other technical advantages will be readily apparent to one skilled in the art from the following figures, descriptions, and claims.

BRIEF DESCRIPTION OF THE DRAWINGS

For a more complete understanding of the present invention and the advantages thereof, reference is now made to the following descriptions taken in connection with the accompanying drawings in which.

DETAILED DESCRIPTION OF THE INVENTION

Figure 1:
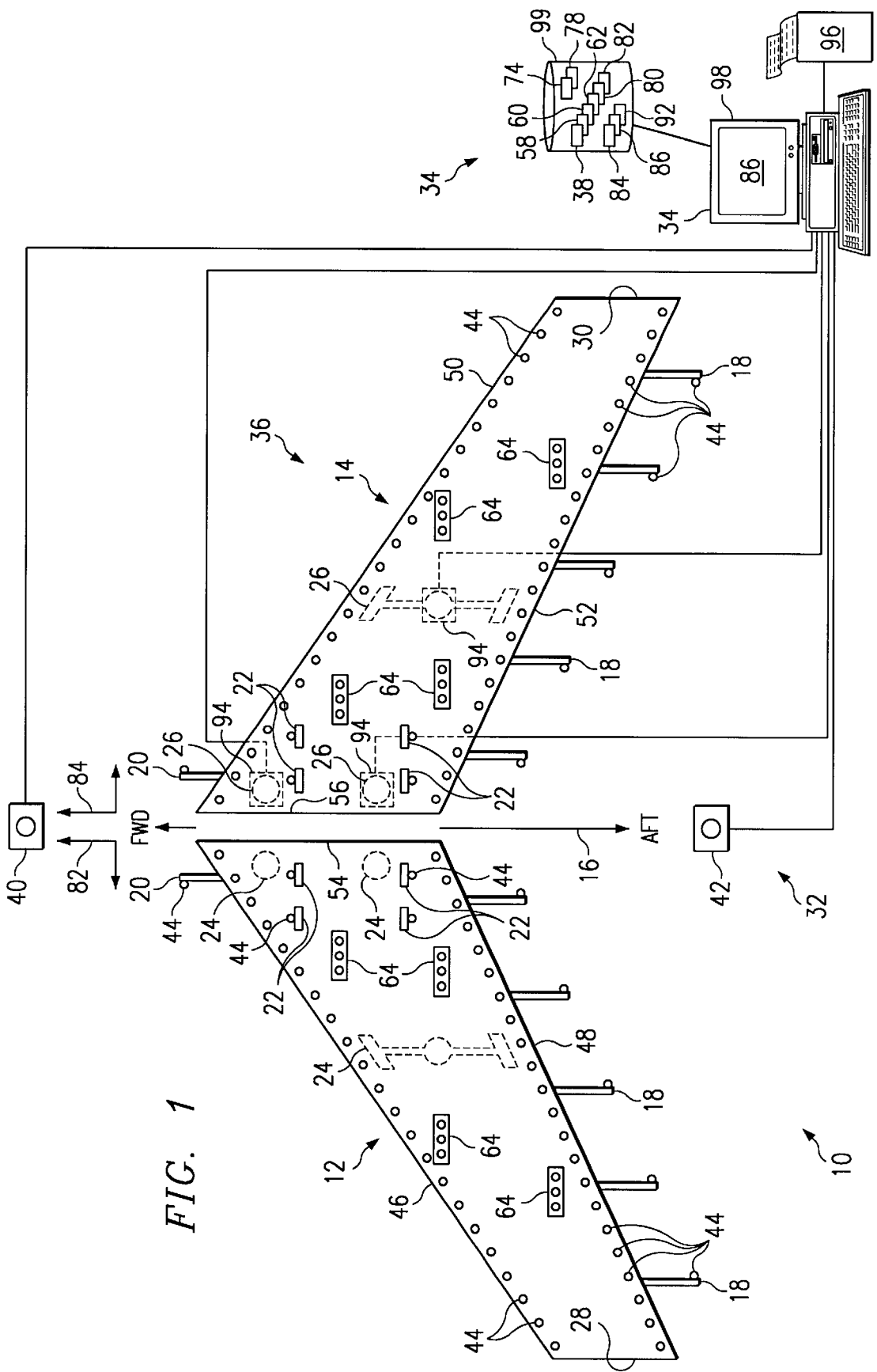
FIG. 1 is a plan view of a system for assembling an aircraft in accordance with the present invention.

FIG. 1 illustrates a plan view of a system 10 for assembling an aircraft in accordance with the present invention. In the embodiment illustrated in FIG. 1, a left wing section 12 and a right wing section 14 are shown in proximity for assembly along a center line 16 of the aircraft. Left wing section 12 and right wing section 14 are often referred to as aircraft subassemblies. In another embodiment, left wing section 12 and right wing section 14 may also be assembled to a center box (not shown) of the aircraft. In a center box type of aircraft, support structure resembling a box is positioned along the center line 16 and extends outwardly on each side of the center line 16 toward outer edges of a fuselage of the aircraft. The center box provides mounting structure for attaching left wing section 12 and right wing section 14 to opposite sides of the fuselage of the aircraft.

As illustrated in FIG. 1, left wing section 12 and right wing section 14 include a plurality of trailing edge fittings 18, a plurality of leading edge fittings 20, and a plurality of fuselage fittings 22. Trailing edge fittings 18, leading edge fittings 20, and fuselage fittings 22 are used for attaching to or mating with other aircraft subassemblies. Thus, the locations of the trailing edge fittings 18, leading edge fittings 20, and fuselage fittings 22 are critical for the proper assembly of the aircraft. Trailing edge fittings 18, leading edge fittings 20, and fuselage fittings 22 may be referred to generally as interface control points of the aircraft.

Left wing section 12 is supported by a plurality of pedestals 24 and right wing section 14 is supported by a plurality of pedestals 26. Pedestals 24 and 26 are positioned beneath left wing section 12 and right wing section 14, respectively, such that the outermost edges of left wing section 12 and right wing section 14 are unsupported, thereby reflecting a substantially 1G loaded position of left wing section 12 and right wing section 14 during assembly. For example, outboard edge 28 of left wing section 12 and outboard edge 30 of right wing section 14 are unsupported during assembly to reflect the position left wing section 12 and right wing section 14 will have after final assembly of the aircraft. Thus, outboard edge 28 of left wing section 12 and outboard edge 30 of right wing section 14 remain unsupported during aircraft assembly, thereby providing the ability to view and inspect left wing section 12 and right wing section 14 for various performance characteristics, such as roll factor and roll moment that result from wing sweep differential, wing twist differential, and wing dihedral angle differential between left wing section 12 and right wing section 14, prior to assembling or mating left wing section 12 and right wing section 14.

System 10 for assembling an aircraft includes an optical positioning system 32, a processor 34, and an adjustment system 36. Optical positioning system 32 generates a three-dimensional representation or predicted mate 38 of left wing section 12 and right wing section 14 prior to assembling left wing section 12 and right wing section 14. Processor 34 comprises a computer, workstation, mini-computer, mainframe or other computing device associated with a display 98 and a volatile or non-volatile memory 99. Processor 34 performs transformation functions on three-dimensional data obtained from optical positioning system 32 for manipulating right wing section 14 to enhance performance characteristics of the aircraft prior to assembling left wing section 12 and right wing section 14. Adjustment system 36 allows graphical and physical manipulation of right wing section 14 in order to achieve the desired performance characteristics of the aircraft prior to assembly. Optical positioning system 32, processor 34, and adjustment system 36 will now be discussed in greater detail.

Optical positioning system 32 includes optical positioning devices 40 and 42 and a plurality of reflectors 44 attached at various locations along left wing section 12 and right wing section 14. In one embodiment, reflectors 44 receive and return optical signals; however, other suitable devices for receiving and returning a signal, such as electromagnetic, acoustic or other forms of energy, may be used. As illustrated in FIG. 1, reflectors 44 are attached along a leading edge 46 and a trailing edge 48 of left wing section 12 and a leading edge 50 and a trailing edge 52 of right wing section 14. Additionally, reflectors 44 are attached to trailing edge fittings 18, leading edge fittings 20, and fuselage fittings 22. In one embodiment of the invention, optical positioning devices 40 and 42 include three-dimensional position finding lasers for determining the location of each reflector 44. An example of a suitable optical positioning device 40 and 42 is manufactured by LEICA under the part No. LTD500; however, other suitable electromagnetic, acoustic, or optical positioning devices may be used for determining the three-dimensional position of each reflector 44.

In operation, left wing section 12 and right wing section 14 are positioned on pedestals 24 and 26 at a predetermined location with respect to a final assembly configuration. For example, an inboard edge 54 of left wing section 12 and an inboard edge 56 of right wing section 14 may be located at a predetermined distance from center line 16. Although left wing section 12 and right wing section 14 may ultimately be assembled at center line 16, left wing section 12 and right wing section 14 may be positioned at any predetermined distance from center line 16 or other suitable orientation for creating predicted mate 38 of left wing section 12 and right wing section 14.

Once left wing section 12 and right wing section 14 are in a fixed position, reflectors 44 are attached to predetermined or pre-targeted locations 58 of left wing section 12 and right wing section 14. Pre-targeted locations 58 on left wing section 12 and right wing section 14 are stored in memory 99 so that optical positioning system 32 can acquire and determine the approximate locations of reflectors 44. For example, reflectors 44 may be attached to interface control points on left wing section 12 and right wing section 14 to assist properly locating other aircraft structure in subsequent aircraft assembly operations. Additionally, reflectors 44 may be located along the leading edges 46 and 50 and trailing edges 48 and 52 of left wing section 12 and right wing section 14, respectively. Optical positioning system 32 uses pre-targeted locations 58 to direct optical signals from optical positioning devices 40 and 42 to the approximate locations of reflectors 44. One important technical advantage of the present invention is the placement of reflectors 44 at or near the wing tips to determine more accurate performance characteristics of the aircraft, such as roll moment and roll factor resulting from wing sweep differential, wing dihedral differential, and wing twist differential between left wing section 12 and right wing section 14.

Once reflectors 44 have been attached to left wing section 12 and right wing section 14, optical positioning system 32 begins acquiring three-dimensional coordinate information for each reflector 44. Optical positioning devices 40 and 42 emit optical signals toward pre-targeted locations 58 stored in memory 99 to determine the three-dimensional profile of left wing section 12 and right wing section 14. Optical positioning system 32 uses pre-targeted locations 58 stored in memory 99 to direct the optical signals toward the approximate locations of reflectors 44. Optical positioning devices 40 and 42 search or scan pre-targeted locations 58 with an optical signal until each reflector 44 is located to within an acceptable accuracy. Thus, each reflector 44 may be located in a zone corresponding to pre-targeted locations 58, thereby eliminating a requirement to precisely locate each reflector 44 on left wing section 12 and right wing section 14.

Optical positioning devices 40 and 42 locate and determine a three-dimensional coordinate for each reflector 44 attached to left wing section 12 and right wing section 14. Physical characteristics of left wing section 12 and right wing section 14 may prevent a single optical positioning device from viewing every reflector 44. Thus, in the embodiment illustrated in FIG. 1, optical positioning device 40 acquires each reflector 44 visible from the leading edge areas;of left wing section 12 and right wing section 14, and optical positioning device 42 acquires each reflector 44 visible from the trailing edge areas of left wing section 12 and right wing section 14. Thus, in the embodiment illustrated, optical positioning device 40 generates a forward three-dimensional dataset 60 and an aft three-dimensional dataset 62 of left wing section 12 and right wing section 14 for storage in memory 99.

Figure 2:
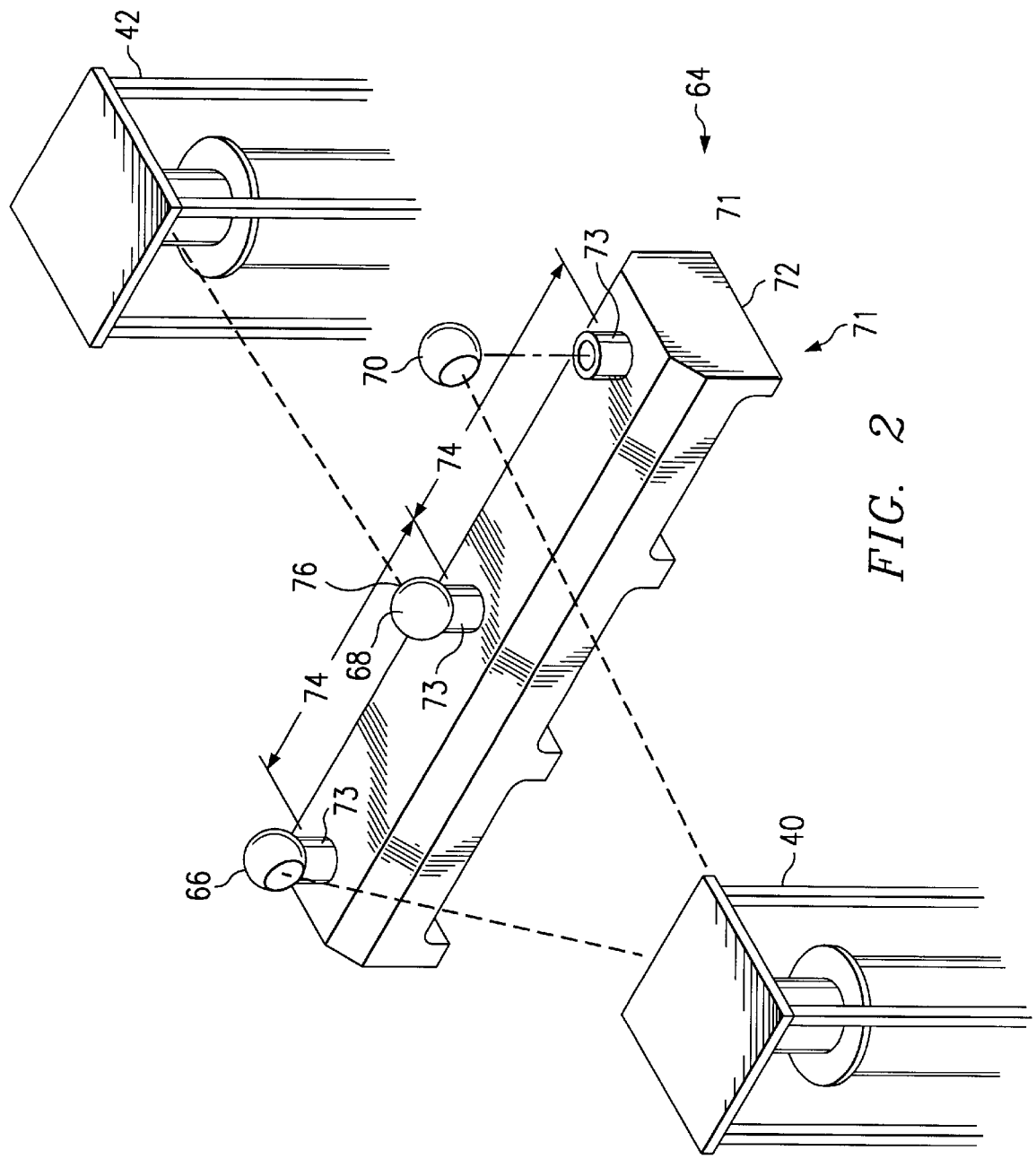
FIG. 2 is an isometric view of a control point assembly constructed in accordance with the present invention.

Each entry in datasets 60 and 62 comprise an identifier for reflector 44 and its approximate coordinates in three-dimensional space. System 10 then correlates forward three-dimensional dataset 60 and aft three-dimensional dataset 62 to generate predicted mate 38 of left wing section 12 and right wing section 14. In one embodiment, system 10 correlates forward three-dimensional dataset 60 and aft three-dimensional dataset 62 using a plurality of control point assemblies 64 attached to left wing section 12 and right wing section 14. FIG. 2 illustrates an embodiment of control point assembly 64, which includes three optical reflectors 66, 68, and 70 attached to a control point fitting 71. Control point fitting 71 includes a fitting base 72 and a plurality of mounts 73. Reflectors 66, 68 and 70 are coupled to mounts 73 in a manner to allow selective adjustment of the orientation of reflectors 66, 68 and 70 in three degrees of freedom. For example, reflectors 66, 68 and 70 may be magnetically coupled to mounts 73; however, other suitable methods of coupling reflectors 66, 68 and 70 may be used to provide three degrees of freedom. Additionally, all reflectors 44 may be attached to left wing section 12 and right wing section 14 in a similar manner.

Optical reflectors 66 and 70 are positioned on control point fitting 71 at a predetermined control point distance 74 from optical reflector 68. Control point distance 74 is stored in memory 99 and, as will be discussed below, is used to correlate forward three-dimensional dataset 60 with aft three-dimensional dataset 62. In one embodiment, distance 74 between reflectors 66 and 68 equals distance 74 between reflectors 68 and 70; however, distance 74 between reflectors 66 and 68 may be a different value than distance 74 between reflectors 68 and 70.

Reflector 68 is oriented on control point fitting 71 to receive an optical signal from one of the optical positioning devices, for example, optical positioning device 42. Reflectors 66 and 70 are oriented on control point fitting 52 to receive an optical signal from a second optical positioning device, for example, optical positioning device 40. Optical positioning device 42 determines a three-dimensional coordinate of reflector 68 and designates reflector 68 as a control point 76. Thus, control point 76 is established for aft three-dimensional dataset 62. Optical positioning device 40 determines three-dimensional coordinates of reflectors 66 and 70. Using control point distance 74 stored in memory 99, optical positioning system 32 determines the equivalent location of control point 76 for forward three-dimensional dataset 60 and aligns forward three-dimensional dataset 60 with aft three-dimensional dataset 62. In a particular embodiment, in which distance 74 between reflectors 66 and 68 equals distance 74 between reflectors 68 and 70, the equivalent location of control point 76 comprises the midpoint of a line drawn in three-dimensional space between the position of reflectors 66 and 70. Additionally, the above described process of aligning independent coordinate systems is applicable to other applications where an obstruction to a line of sight exists.

Also stored in memory 99 is a design dataset 78 that reflects an as designed three-dimensional representation of left wing section 12 and right wing section 14 in a designed coordinate system. Once forward three-dimensional dataset 60 and aft three-dimensional dataset 62 are aligned, optical positioning system 32 transforms forward three-dimensional dataset 60 and aft three-dimensional dataset 62 using design dataset 78 to the three-dimensional design coordinate system. The result of the transformation is an as-built geometry 80 that reflects a three-dimensional representation of left wing section 12 and right wing section 14 in the design coordinate system. As an example, the design coordinate system may be a set of three orthogonal axes positioned on center line 16 with a y-axis extending in an outboard direction and an x-axis extending in an aft direction. As-built geometry 80 is stored in memory 99. As will be discussed below, as-built geometry 80 is used to compare left wing section 12 with right wing section 14 to generate predicted mate 38.

Processor 34, using as-built geometry 80, generates a left wing three-dimensional coordinate system 82 and a right wing three-dimensional coordinate system 84. Processor 34 aligns left wing three-dimensional coordinate system 82 with right wing three-dimensional coordinate system 84 and generates predicted mate 38 of left wing section 12 and right wing section 14. One important technical advantage of the present invention is the generation of predicted mate 38 in an electronic format using processor 34. This allows assembly modifications and adjustments to be performed electronically before any physical adjustments or assembly is performed.

As will be discussed in greater detail in conjunction with FIG. 3, processor 34 compares predicted mate 38 to design dataset 78 and generates a computer representation 86. Computer representation 86 displays interface control points of the aircraft and performance characteristics of the aircraft, such as wing sweep differential, wing dihedral angle differential, and wing twist differential between left wing section 12 and right wing section 14. As will be discussed below, adjustment system 36 is used to enhance performance characteristics of the aircraft and maintain interface control point coordination with other aircraft structure during assembly of the aircraft.

Figure 3:
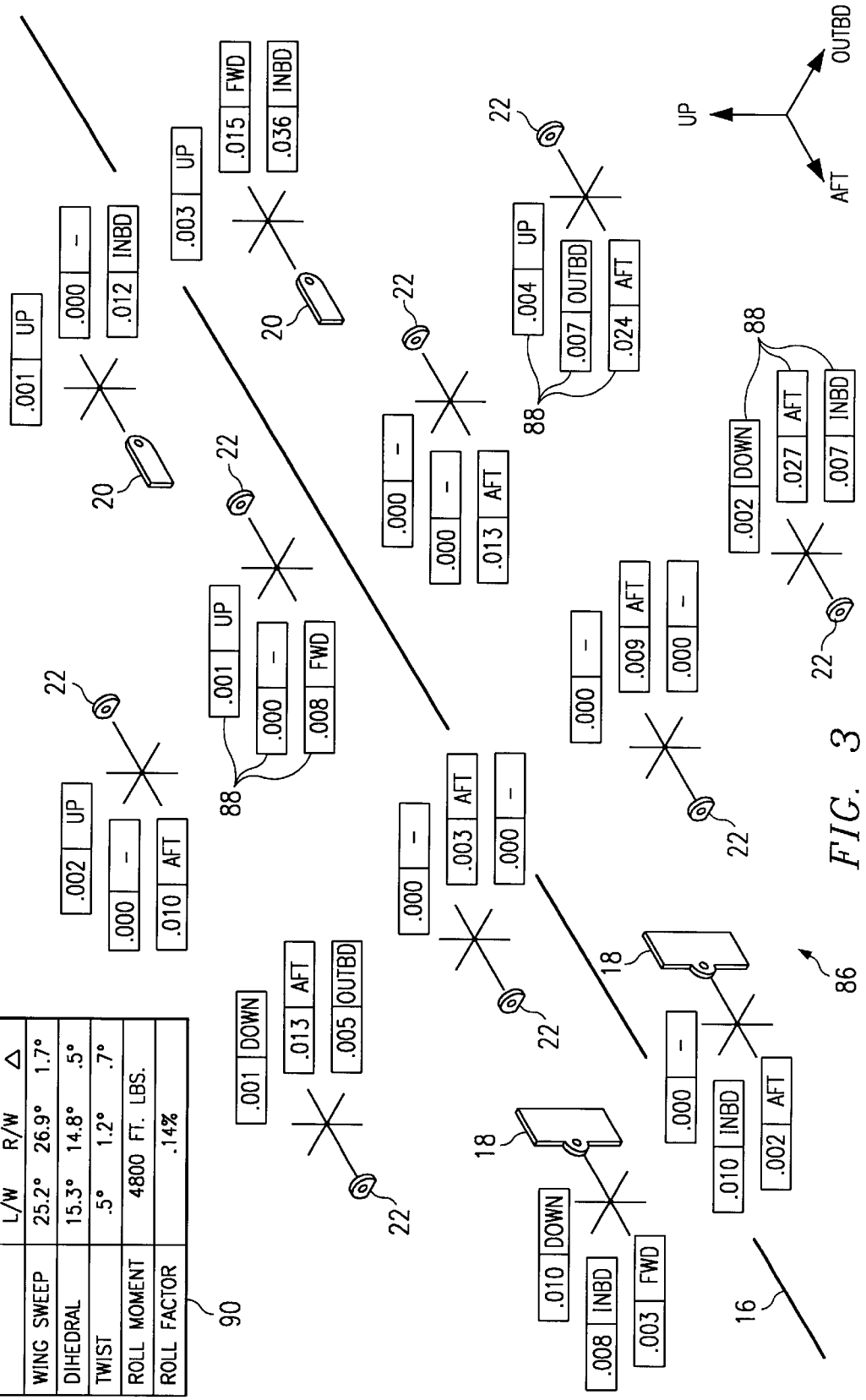
FIG. 3 illustrates a computer representation of an adjustment system according to the present invention.

FIG. 3 illustrates computer representation 86 of predicted mate 38. Computer representation 86 includes interface control point information for trailing edge fittings 18, leading edge fittings 20, and fuselage fittings 22. Additionally, computer representation 86 includes performance characteristics of left wing section 12 and right wing section 14 such as wing sweep differential, wing dihedral differential, and wing twist differential.

As illustrated in FIG. 3, tolerance ranges for interface control points on trailing edge fittings 18, leading edge fittings 20, and fuselage fittings 22 reflect forward, aft, inboard, outboard, upward, or downward mislocation of fittings 18–22. Computer representation 86 is an interactive representation of predicted mate 38. Thus, adjustment system 36 allows graphical manipulation of right wing section 14 with respect to left wing section 12 to control or alter the interface control points and performance characteristics of the aircraft prior to assembling left wing section 12 and right wing section 14.

For example, each interface control point illustrated in FIG. 3 is associated with an interface control tolerance block 88. Right wing section 14 may be graphically moved a desired amount in an attempt to bring all mislocations of interface control points on trailing edge fittings 18, leading edge fittings 20, and fuselage fittings 22 within acceptable tolerance limits. Tolerance blocks 88 may contain drop down menu-type options for changing the location of interface control points or may contain other suitable methods for adjusting the locations of the interface control points. For example, a particular tolerance block 88 may be selected in order to move a particular interface control point within an acceptable tolerance range.

Performance characteristics of the aircraft may be altered in a similar manner by graphically moving right wing section 14 to a desired location. For example, as illustrated in FIG. 3, performance characteristics of the aircraft may be shown in a performance characteristics table 90. A particular performance characteristic, such as wing sweep angle, may be altered by selecting the desired characteristic and changing the value of the characteristic. Each time right wing section 14 is graphically repositioned, processor 54 determines and stores an adjusted mate 92 based on the desired position of right wing section 14. Interface control points and performance characteristics of the aircraft may be altered repeatedly and iteratively prior to physically moving right wing section 14. In this manner, system 10 positions right wing section 14 to optimize interface control points and performance characteristics of the aircraft.

Another technical advantage of system 10 is the ability to designate certain interface control points as acceptable while designating other interface control points for rework using computer representation 86 of predicted mate 38. For example, if all except one interface control point on trailing edge fittings 18, leading edge fittings 20, and fuselage fittings, 22 fall within acceptable tolerance ranges, the one fitting containing the out of tolerance interface control point may be removed from the aircraft and reworked. In one embodiment of the invention, as illustrated in FIG. 3, computer representation 86 illustrates the amount and direction the interface control point is out of tolerance. Computer representation 86 may also indicate out of tolerance conditions in other suitable manners, such as color coded tolerance ranges or blinking interface control point locations. Computer representation 86 provides precise measurements regarding specific directions the interface control point is out of tolerance. For example, if the interface control point is out of tolerance 0.025 inches in the aft direction, the fitting may be reworked in a manner to bring the interface control point 0.025 inches forward. Thus, assembling left wing section 12 and right wing section 14 may proceed while the interface control point is reworked. After rework, the reworked fitting may be reinstalled onto the aircraft in the reworked fitting's original location.

Another technical advantage of system 10 is the ability to alter the performance characteristics of the aircraft using computer representation 86 of predicted mate 38 prior to assembling left wing section 12 and right wing section 14. For example, due to variations in manufacturing left wing section 12 and right wing section 14, wing sweep differential, wing dihedral differential and wing twist differential between left wing section 12 and right wing section 14 may result in unacceptable performance characteristics of the aircraft. Right wing section 14 may be graphically moved using computer representation 86 in order to improve the performance characteristics. Additionally, if more than one wing subassembly is available, left wing section 12 or right wing section 14 may be removed and replaced with a new wing subassembly that better matches its mate. Thus, system 10 provides greater flexibility of assembling aircraft than conventional assembling systems.

Once a location of right wing section 14 has been determined using computer representation 86, system 10 initiates adjustment system 36 to physically move right wing section 14 to the desired location. Adjustment system 36 includes a plurality of actuators 94 attached to right wing section 14 for moving right wing section 14 to the desired location; however, actuators 94 may be attached to left wing section 12 instead of right wing section 14, or actuators 94 may be attached to both left wing section 12 and right wing section 14 to adjust the positions of left wing section 12 and right wing section 14 with respect to one another. Each actuator 94 is capable of three-dimensional movement to provide six degrees of freedom of right wing section 14. Additionally, actuators 94 may include local feedback capability for accurate determination of the positional change of right wing section 14. Actuators 94 may include electrically powered motors or may include other types of motors, such as hydraulically or pneumatically controlled motors.

Once right wing section 14 has been physically moved into the desired position using actuators 94, processor 34 generates and stores adjusted mate 92. Adjusted mate 92 may be based on computer representation 86 and the projected move performed by actuators 94, or may be determined by reinitiating optical positioning system 32 to acquire new three-dimensional coordinates of reflectors 44. Processor 34 also generates interface control point tolerances and performance characteristics based on adjusted mate 92. This information may be downloaded as a report to an external communications medium 96, such as a printer, fax machine, disk or other suitable output device.

Additionally, after positioning right wing section 14 using actuators 94, left wing section 12 and right wing section 14 may be assembled. In one embodiment, left wing section 12 and right wing section 14 are held in place, holes are drilled into left wing section 12 and right wing section 14, and fasteners are installed joining left wing section 12 and right wing section 14. Thus, system 10 provides increased measurement and control of interface control points and performance characteristics of the aircraft prior to assembly of the aircraft than conventional aircraft assembly systems.

In one embodiment of the invention, system 10 uses CATIA design software, AXYZ control software associated with optical positioning system 32 available from LEICA, Windows 95 and Visual Basic 5.0 operating software available from Microsoft, PTALK and PMAC control software available from Delta Tau Data Systems and 930 Dialog software available from Pacific Scientific associated with actuators 94. These software packages can be readily integrated by those having ordinary skill in the art.

Figure 4A:
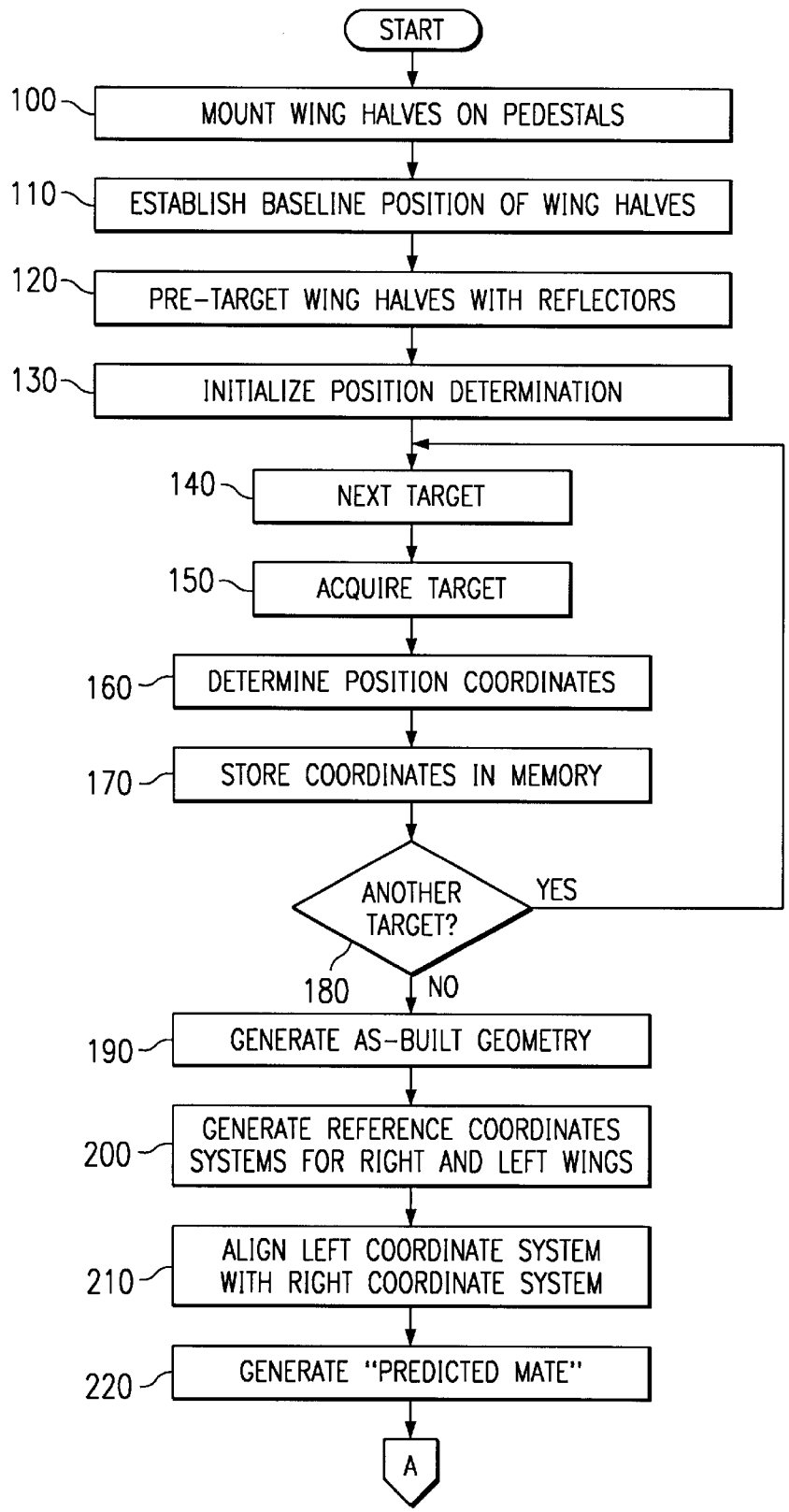
FIGS. 4A and 4B illustrate a flow chart of a method to assemble an aircraft according to the present invention.
Figure 4B:
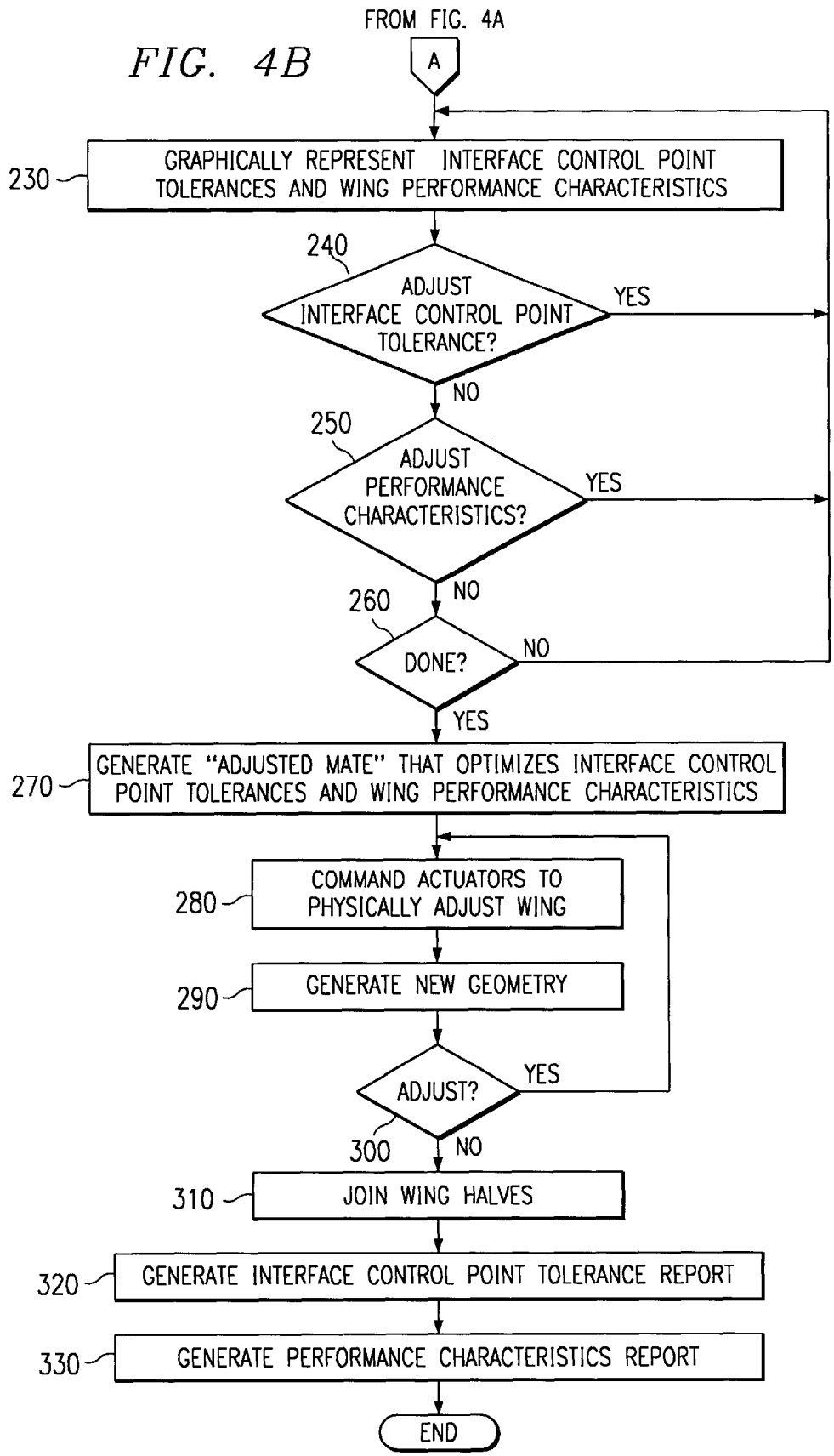

FIGS. 4A and 4B illustrate a flow chart of a method to assemble an aircraft according to the present invention. Left wing section 12 and right wing section 14 are mounted on pedestals 24 and 26 at step 100. System 10 positions left wing section 12 and right wing section 14 on pedestals 24 and 26 to coordinate locations on left wing section 12 and right wing section 14 to receive reflectors 44 with pre-target locations 58 stored in memory 99 at step 110.

Reflectors 44 are attached to left wing section 12 and right wing section 14 at step 120. Processor 34 initiates optical positioning system 32 to determine a three-dimensional coordinate of each reflector 44 attached to left wing section 12 and right wing section 14 at step 130. Optical positioning system 32 designates a reflector 44 to be acquired at step 140, and optical positioning devices 40 and 42 scan or search a zone corresponding to pre-target location 58 for the designated reflector 44 until the designated reflector 44 is located at step 150. Optical positioning devices 40 and 42 determine a three-dimensional coordinate of a reflector 44 at step 160, for example, by reading accurate angle resolves in the gimballed mount of optical positioning devices 40 and 42. Optical positioning devices 40 and 42 may operate independently of one another, or may operate in a specified sequence of reflectors 44. Processor 34 stores the three-dimensional coordinate for a reflector 44 in a dataset in memory 99 at step 170. For example, a reflector 44 visible only to optical positioning device 40 is stored in forward three-dimensional dataset 60. Optical positioning system 32 determines whether another reflector 44 needs to be acquired at step 180. If there is another reflector 44 to be acquired, the method proceeds to step 140. If there are no more reflectors 44 to be acquired, the method proceeds to step 190.

Processor 34 aligns forward three-dimensional dataset 60 and aft three-dimensional dataset 62 to generate as-built geometry 80 of left wing section 12 and right wing section 14 at step 190. As previously discussed, a single optical positioning device may be unable to view all reflectors 44 attached to left wing section 12 and right wing section 14. As illustrated in FIG. 1, optical positioning device 40 acquires reflectors 44 visible from the leading edges of left wing section 12 and right wing section 14, and optical positioning device 42 acquires reflectors 44 visible from the trailing edges of left wing section 12 and right wing section 14. In one embodiment, using control point assemblies 64 and control point distance 74 stored in memory 99, system 10 aligns forward three-dimensional dataset 60 and aft three-dimensional dataset 62 to generate as-built geometry 80.

Processor 34 generates left wing three-dimensional coordinate system 82 and right wing three-dimensional coordinate system 84 using as-built geometry 80 and design dataset 78 stored in processor 34 at step 200. Processor 34 transforms as-built geometry 80 using design dataset 78 to generate left wing three-dimensional coordinate system 82 and right wing three-dimensional coordinate system 84 so that left wing three-dimensional coordinate system 82 and right wing three-dimensional coordinate system 84 may be viewed in accordance with the aircraft design coordinate system.

Processor 34 aligns left wing three-dimensional coordinate system 82 with right wing three-dimensional coordinate system 84 to generate predicted mate 38 of left wing section 12 and right wing section 14 at step 210. Display 98 generates computer representation 86 of predicted mate 38 which illustrates interface control point tolerances and performance characteristics of left wing section 12 and right wing section 14.

System 10 determines whether right wing section 14 requires positional adjustment to bring interface control points of the aircraft within acceptable tolerances at step 240. If adjustment is required, right wing section 12 may be graphically adjusted to a desired position. Computer representation 86 displays interface control point tolerances based on the graphical move of right wing section 14. If no adjustment is required, the method proceeds to step 250.

System 10 determines whether right wing section 14 requires positional adjustment to enhance performance characteristics of the aircraft at step 250. If adjustment is required, right wing section 12 may be graphically adjusted to a desired position or automatically adjusted by processor 34 to optimize interface control point tolerances and performance characteristics of the aircraft. Computer representation 86 displays interface performance characteristics based on the graphical move of right wing section 14. If no adjustment is required, the method proceeds to step 260. At step 260, if additional adjustment of right wing section 14 is required, the method proceeds to step 230. If no additional adjustment to right wing section 14 is required, the method proceeds to step 270.

Processor 34 generates adjusted mate 92 based on graphical changes in position of right wing section 14 at step 270.

Adjusted mate 92 reflects an optimization of interface control point tolerances and performance characteristics of the aircraft based on changes in position of right wing section 14 made to computer representation 86. Processor 34 commands actuators 94 to physically position right wing section 14 according to adjusted mate 92 at step 280.

Processor 34 generates computer representation 86 reflecting adjusted mate 92 at step 290. Computer representation 86 reflecting adjusted mate 92 may be generated based on the graphical moves made to right wing section 14, or may be generated by reinitializing optical positioning system 32 to acquire new three-dimensional coordinates for reflectors 44. Thus, the above described process may be repeated any number of times to bring interface tolerance control point tolerances and performance characteristics within acceptable limits. System 10 determines whether additional physical adjustment to right wing section 14 is required at step 300. If additional adjustment is required, the method proceeds to step 280. If no further adjustment to right wing section 14 is required, the method proceeds to step 310.

Left wing section 12 and right wing section 14 are joined or assembled at step 310. Processor 34 generates an interface control report containing the tolerance ranges and rework information of the interface control points on left wing section 12 and right wing section 14 at step 320. Processor 34 generates a performance characteristics report at step 330 containing information regarding roll moment, roll factor, wing sweep differential, wing dihedral angle differential, wing twist differential, and other performance measures between left wing section 12 and right wing section 14. The information contained in the interface control report and the performance characteristics report will be based on adjusted mate 92 if adjustments were made to the position of right wing section 14. If no adjustments were made to the position of right wing section 14, the information contained in the interface control report and the performance characteristics report will be based on predicted mate 38.

Figure 5:
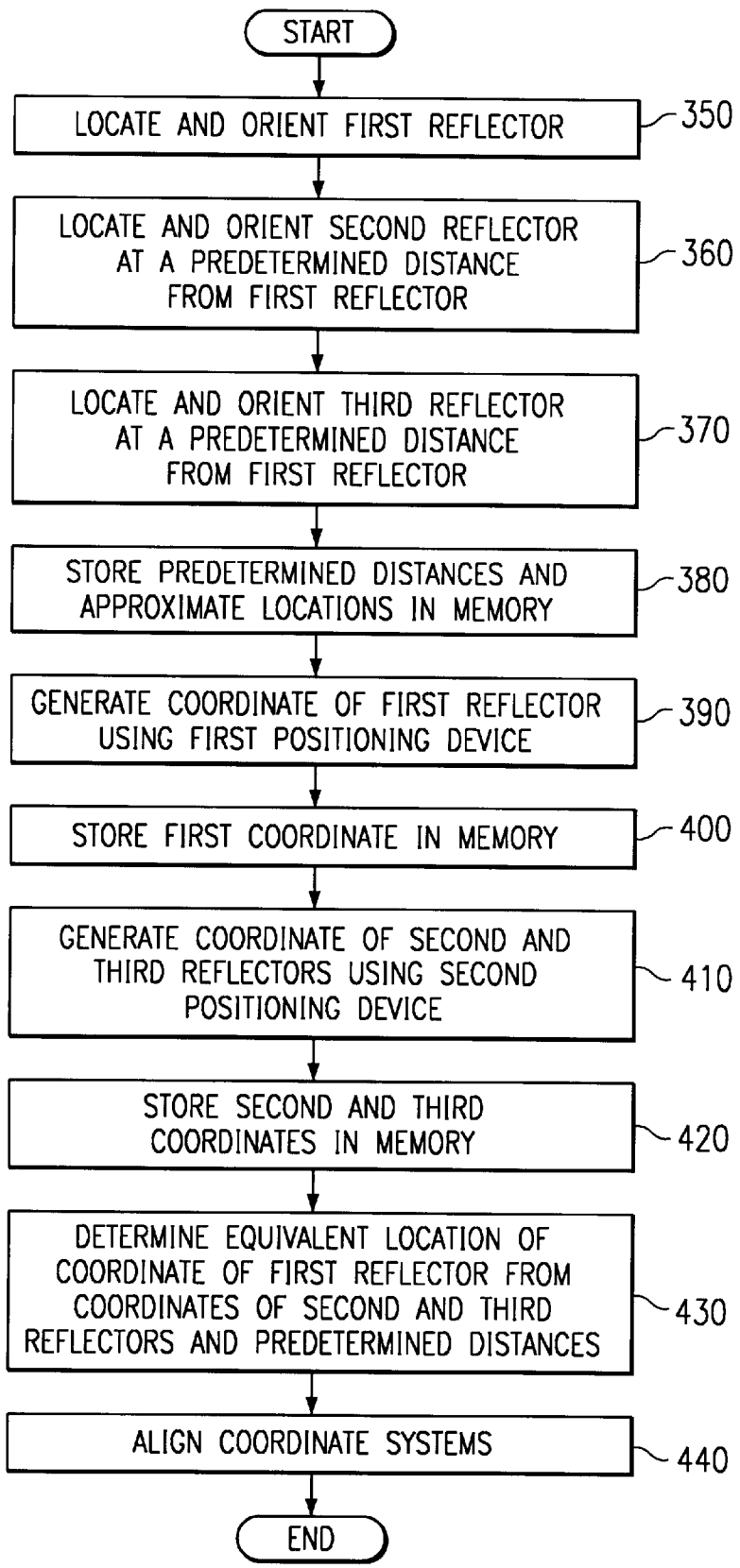
FIG. 5 illustrates a flow chart of a method for aligning aircraft coordinate systems in accordance with the present invention.

FIG. 5 illustrates a flow chart of a method to align datasets created by independent optical positioning devices, for example, aligning forward three-dimensional dataset 60 and aft three-dimensional dataset 62 discussed in conjunction with FIG. 2, according to the present invention. Reflector 68 is located and oriented on control fitting 71 to receive an optical signal from optical positioning device 42 at step 350. Reflector 66 is located and oriented on control fitting 71 at control point distance 74 from reflector 68 to receive an optical signal from optical positioning device 40 at step 360. Reflector 70 is located and oriented on control fitting 71 at control point distance 74 from reflector 68 to receive an optical signal from optical positioning device 40 at step 370. Processor 34 stores control point distance 74 and approximate locations of reflectors 66, 68 and 70 in memory 99 at step 380.

Optical positioning system 32 generates a three-dimensional coordinate of reflector 68 using optical positioning device 42 at step 390. Processor 34 designates the three-dimensional coordinate of reflector 68 as control point 76 and stores the three-dimensional coordinate of reflector 68 in aft three-dimensional dataset 62 in memory 99 at step 400. Optical positioning system 32 generates three-dimensional coordinates of reflectors 66 and 70 using optical positioning device 40 at step 410. Processor 34 stores the three-dimensional coordinates of reflectors 66 and 70 in forward three-dimensional dataset 60 in memory 99 at step 420.

Processor 34 determines an equivalent location of control point 76 for forward three-dimensional dataset 60 using the three-dimensional coordinates of reflectors 66 and 70 and control point distance 74 stored in memory 99 at step 430. For example, in an embodiment where control point distance 74 between reflector 66 and 68 is equal to control point distance 74 between reflectors 68 and 70, processor 34 can calculate the equivalent location of control point 76 as the midpoint along a line between reflectors 66 and 70. Processor 34 aligns forward three-dimensional dataset 60 with aft three-dimensional dataset 62 using control point 76 from aft three-dimensional dataset 62 and the equivalent location of control point 76 for forward three-dimensional dataset 60 at step 440.

Although the present invention and its advantages have been described in detail, it should be understood that various changes, substitutions, and alterations, can be made therein without departing from the spirit and scope of the present invention as defined by the appended claims.

What is claimed is:

1. An apparatus for aligning a first aircraft coordinate system associated with a first positioning device with a second aircraft coordinate system associated with a second positioning device, comprising:
   a control point fitting adapted to be releasably secured to one of a plurality of locations on an aircraft structure, the first and second aircraft coordinate systems corresponding to the aircraft structure;
   a first reflector mounted to the control point fitting and oriented to receive a signal from the first positioning device, the first aircraft coordinate system associated with the first positioning device;
   a second reflector mounted to the control point fitting and oriented to receive a signal from the second positioning device, the second reflector disposed a first predetermined distance from the first reflector, the second aircraft coordinate system associated with the second positioning device; and
   a third reflector mounted to the control point fitting and oriented to receive a signal from the second positioning device, the third reflector disposed a second predetermined distance from the first reflector.

2. The apparatus of claim 1, wherein the first predetermined distance is substantially equal to the second predetermined distance.

3. The apparatus of claim 1, wherein the first reflector is disposed along a line between the second and third reflectors.

4. The apparatus of claim 1, the first reflector comprises a spherical reflector.

5. The apparatus of claim 1, wherein the control point fitting comprises:
   a base; and
   a plurality of mounts, each mount associated with a reflector, each mount operable to couple the associated reflector to the base.

6. The apparatus of claim 5, wherein the mounts and the first, second, and third reflectors are coupled in a manner to allow selective adjustment of the orientation of each of the first, second, and third reflectors in three degrees of freedom.

7. The apparatus of claim 1, wherein:
   the first and second positioning devices comprise optical positioning devices; and
   each of the first, second, and third reflectors is operable to receive and return an optical signal generated by the first and second positioning devices.

8. A system for aligning aircraft coordinate systems, comprising:
   a control point assembly adapted to be releasably secured to one of a plurality of locations on an aircraft, the coordinate systems corresponding to the aircraft, the control point assembly comprising:
   a first reflector;
   a second reflector disposed a first predetermined distance from the first reflector; and
   a third reflector disposed a second predetermined distance from the first reflector;
   a first positioning device operable to determine a position of the first reflector in a first aircraft coordinate system;
   a second positioning device operable to determine a position of the second and third reflectors in a second aircraft coordinate system; and
   a processor coupled to the first and second positioning devices, the processor operable to align the first aircraft coordinate system with the second aircraft coordinate system using the positions of the first, second, and third reflectors and the first and second predetermined distances.

9. The system of claim 8, wherein the control point assembly further comprises a control point fitting, and wherein the first, second, and third reflectors are coupled to the control point fitting in a manner to allow selective adjustment of an orientation of the first, second, and third reflectors in three degrees of freedom.

10. The system of claim 9, wherein the control point assembly is releasably secured to the aircraft structure.

11. The system of claim 8, wherein the first predetermined distance is substantially equal to the second predetermined distance.

12. The system of claim 8, wherein:
    the first predetermined distance is substantially equal to the second predetermined distance; and
    the first, second, and third reflectors are arranged along a line.

13. The system of claim 9, wherein the control point fitting comprises:
    a base; and
    a plurality of mounts attached to the base, wherein the first, second, and third reflectors are disposed on the plurality of mounts.

14. The system of claim 9, wherein the first, second, and third reflectors are magnetically coupled to the control point fitting.

15. The system of claim 8, wherein:
    the first and second positioning devices comprise optical positioning devices; and
    each of the first, second, and third reflectors is operable to receive and return an optical signal generated by the first and second positioning devices.

16. A system for aligning coordinate systems, comprising:
    a control point assembly adapted to be releasably secured to a structure, the coordinate systems corresponding to the structure, the control point assembly comprising:
    a first reflector;
    a second reflector disposed a first predetermined distance from the first reflector; and
    a third reflector disposed a second predetermined distance from the first reflector;
    a first positioning device operable to determine a position of the first reflector in a first coordinate system from a first direction relative to the structure;
    a second positioning device operable to determine a position of the second and third reflectors in a second coordinate system from a second direction relative to the structure, the first direction different from the second direction; and a processor coupled to the first and second positioning devices, the processor operable to align the first coordinate system with the second coordinate system using the positions of the first, second, and third reflectors and the first and second predetermined distances.

17. The system of claim 16, wherein the control point assembly further comprises a control point fitting, and wherein the first, second, and third reflectors are coupled to the control point fitting in a manner to allow selective adjustment of an orientation of the first, second, and third reflectors corresponding to the first and second respective directions.

18. The system of claim 17, wherein the control point fitting is releasably secured to the structure.

19. The system of claim 16, wherein the first, second, and third reflectors are disposed in substantially linear alignment relative to each other.

20. The system of claim 16, wherein the first and second predetermined distances are substantially equal.

21. A system for aligning independent coordinate systems, comprising:

a control point assembly adapted to be releasably secured to a structure, the control point assembly comprising:
a first reflector;
a second reflector disposed a first predetermined distance from the first reflector; and
a third reflector disposed a second predetermined distance from the first reflector;

a first positioning device operable to determine a position of the first reflector in a first coordinate system associated with the structure;

a second positioning device operable to determine a position of the second and third reflectors in a second coordinate system associated with the structure, the first coordinate system independent from the second coordinate system; and a processor coupled to the first and second positioning devices, the processor operable to align the independent first and second coordinate systems using the positions of the first, second, and third reflectors and the first and second predetermined distances.

22. The system of claim 21, wherein the control point assembly comprises a control point fitting, the first, second, and third reflectors coupled to the control point fitting.

23. The system of claim 22, wherein the first, second, and third reflectors are disposed in substantially linear alignment relative to each other.

24. The system of claim 22, wherein the control point assembly comprises a portable unit adapted to be releasably secured to a plurality of locations relative to the structure.

25. The system of claim 21, wherein the first and second predetermined distances are substantially equal.

* * * * *